(12) United States Patent
Oogami et al.

(10) Patent No.: US 6,541,154 B2
(45) Date of Patent: Apr. 1, 2003

(54) MULTI-CELL STRUCTURE BATTERY FOR ELECTRIC MOTOR POWERED VEHICLE

(75) Inventors: Etsuo Oogami, Kanagawa (JP); Tatsuo Horiba, Saitama (JP)

(73) Assignees: Nissan Motor Co., Ltd., Kanagawa (JP); Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/804,058

(22) Filed: Mar. 13, 2001

(65) Prior Publication Data

US 2002/0102457 A1 Aug. 1, 2002

(30) Foreign Application Priority Data

Mar. 15, 2000 (JP) ........................................ 2000-071557

(51) Int. Cl.⁷ ........................... H01M 6/42; B60R 16/04
(52) U.S. Cl. ...................... 429/159; 429/156; 429/158; 429/153; 429/160; 429/161; 429/163; 429/149; 429/176; 429/65; 180/68.5
(58) Field of Search ................................. 429/153, 149, 429/159, 158, 160, 161, 163, 65, 156, 176; 180/68.5

(56) References Cited

U.S. PATENT DOCUMENTS 4,850,884 A * 7/1989 Sawai et al. .................. 439/76
5,866,276 A   2/1999 Ogami et al.
6,186,806 B1 * 2/2001 Suzuki et al. ................ 439/189
6,410,184 B1 * 6/2002 Horiuchi et al. ............. 429/156

FOREIGN PATENT DOCUMENTS

JP        9-86188         3/1997

OTHER PUBLICATIONS

Co–pending related U.S. patent application Ser. No. 09/804,077, filed Mar. 13, 2001 (Our Ref. 50353–561).

* cited by examiner

Primary Examiner—Patrick Ryan
Assistant Examiner—Angela J Martin
(74) Attorney, Agent, or Firm—McDermott, Will & Emery

(57) ABSTRACT

A multi-cell structure battery (1A) comprising: a plurality of columnar cells accommodated in a casing (11); bus bars (23A, 23B) to connect respective terminals of the cells; signal transmitting wires (16) to connect the respective cells to an external device; a cell holder (12) to hold the cells; and a covering (13) fixed to the cell holder so as to oppose against the terminals of the cells, the bus bars being disposed on an inner surface of the covering opposed to the terminals of the cells and the signal transmitting wires being disposed in an outer surface of the covering.

14 Claims, 17 Drawing Sheets

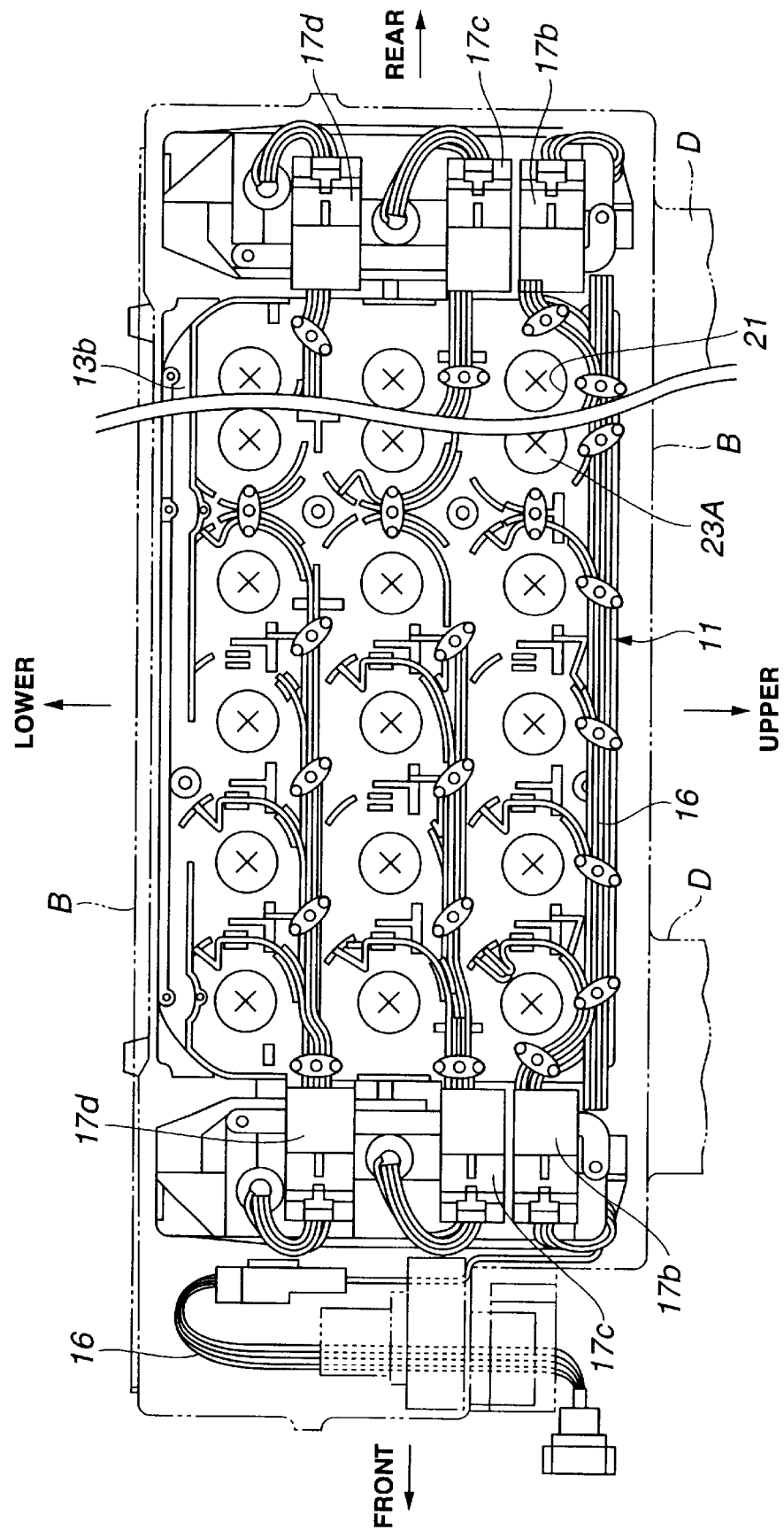

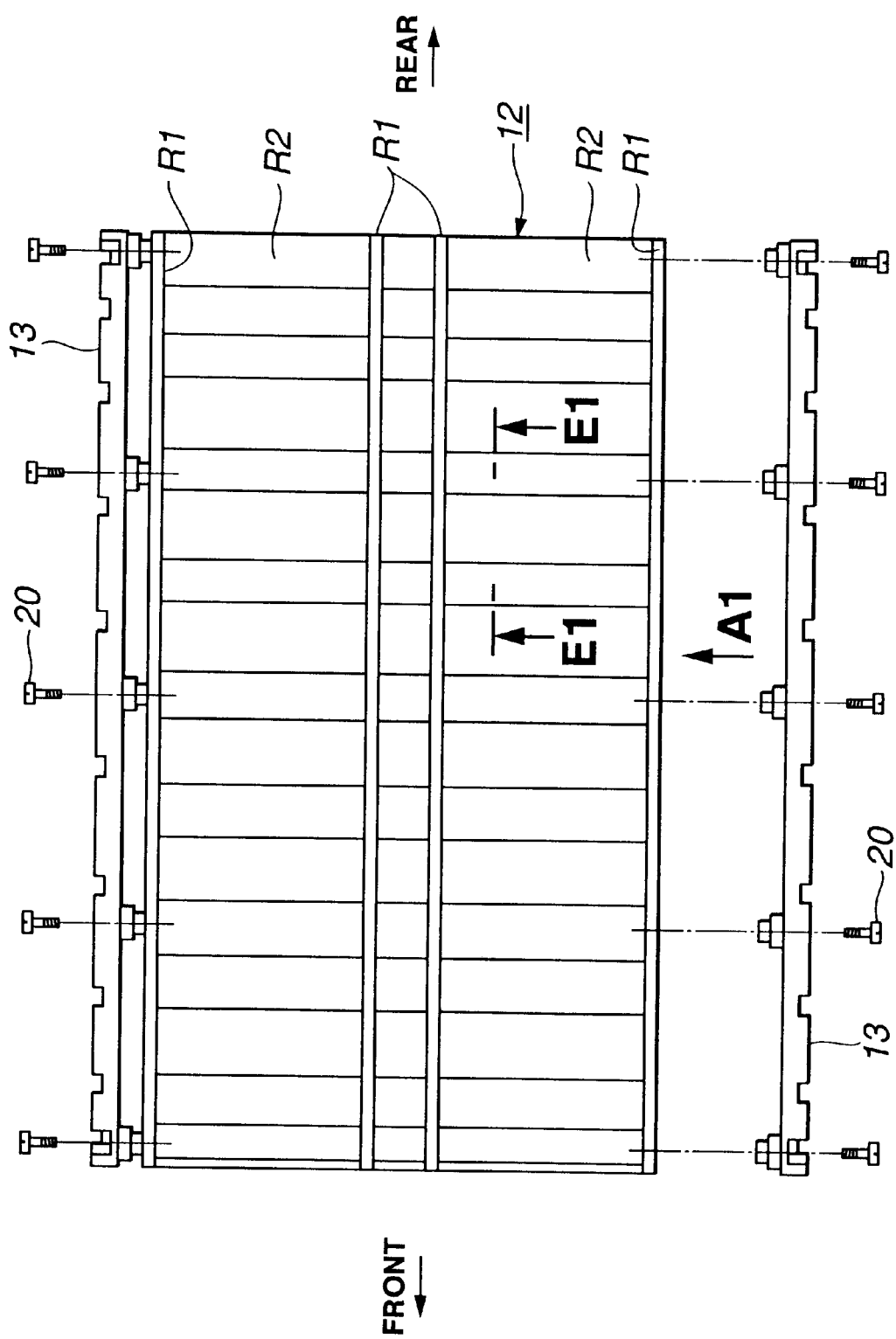

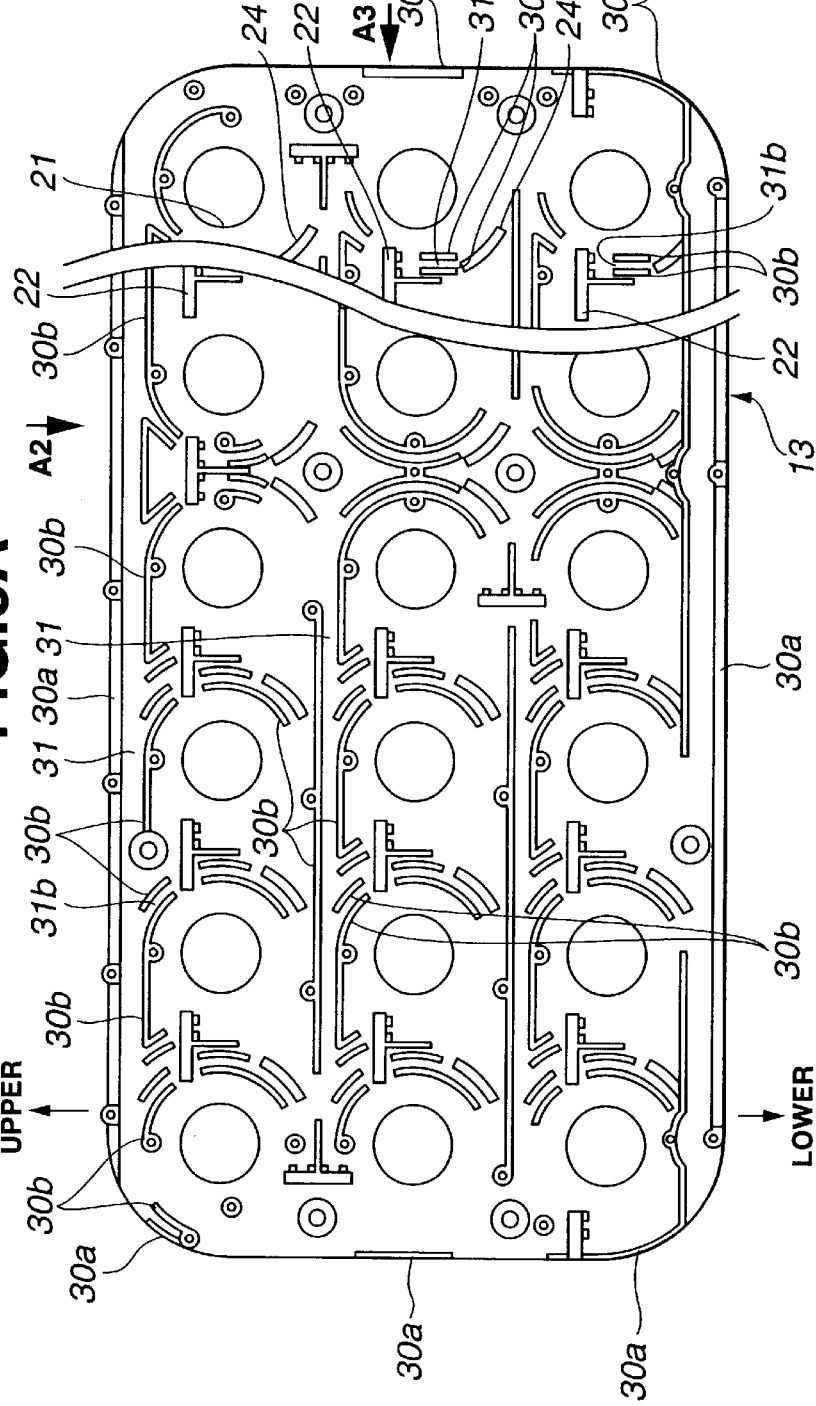

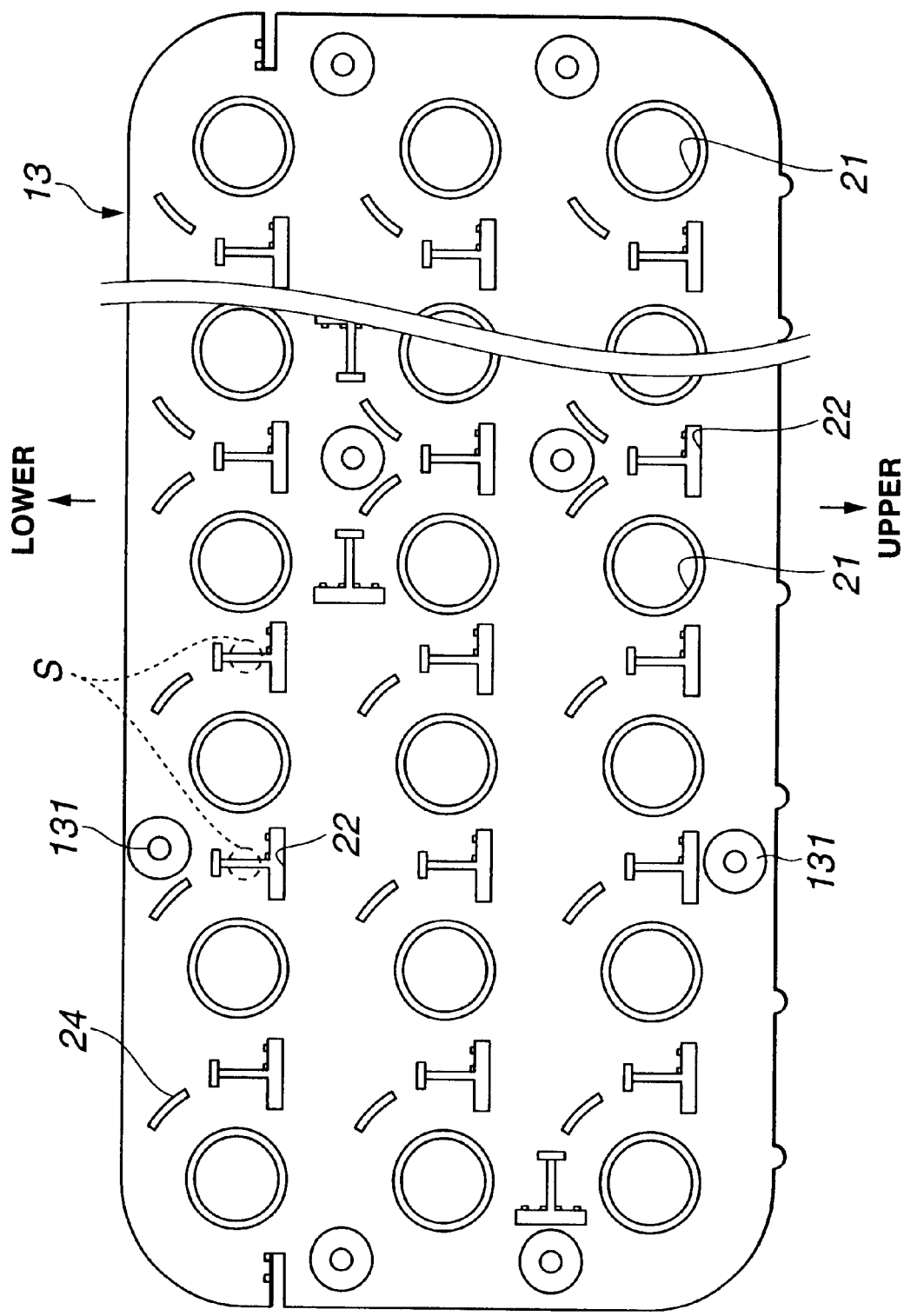

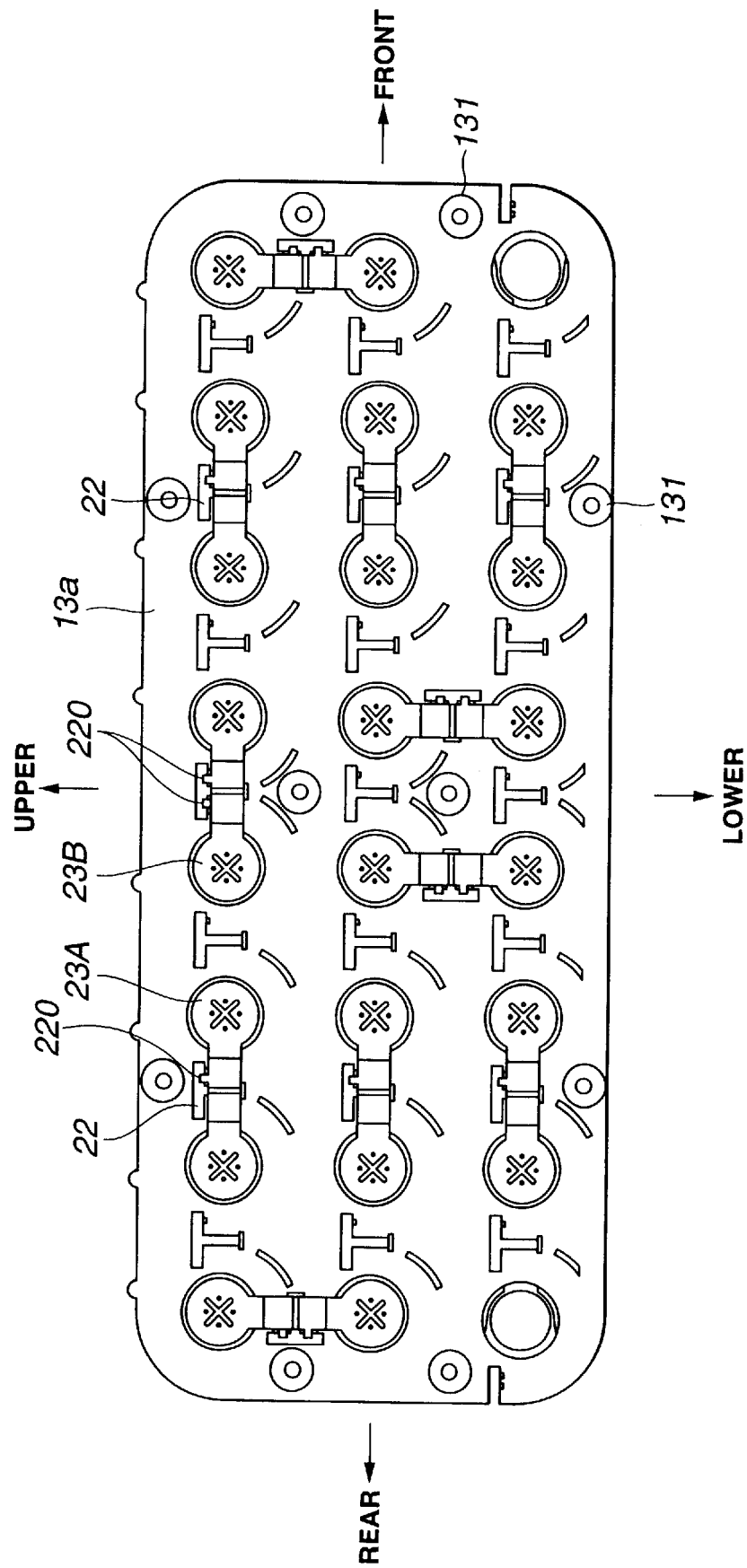

MULTI-CELL STRUCTURE BATTERY FOR ELECTRIC MOTOR POWERED VEHICLE

BACKGROUND OF THE INVENTION a) Field of the Invention

The present invention relates to a multi-cell battery structure applicable to an electric vehicle or hybrid vehicle, viz., an electric motor powered vehicle.

b) Description of the Related Art

A Japanese Patent Application First Publication No. Heisei 9-86188 published on Mar. 31, 1997 which corresponds to a U.S. Pat. No. 5,866,276 issued on Feb. 2, 1999 exemplifies a previously proposed battery structure for an electric vehicle (EV).

It is a general practice that, in a case where a large capacity of the battery is used in the electric vehicle, a plurality of cells are connected partially in parallel to each other or connected in series with each other to form a battery.

In the battery cell structure disclosed in the above-described United States Patent, eight cells are housed in a battery casing to form a cell group of battery. Bus bars (so-called, high power system wires) to be caused to flow electric current outputted from the battery to drive the vehicle are disposed within a battery casing.

On the other hand, a cell controller is used to control the battery so as to make states (charge and discharge states) of each cell to form the battery equal to each other. Signal transmitting wires (low power system wires) are distributed between the battery and the cell controller. The signal transmitting wires include cell terminal voltage measuring wires, control-purpose wires, and wires connected to a sensor to detect a temperature of the battery.

SUMMARY OF THE INVENTION

However, since, in the previously proposed battery cell structure disclosed in the above-described United States Patent, the battery is constituted by a relatively small number of cells so that no special consideration of wiring method (how to distribute the wires in the casing) for the low power wirings and the high power wirings in the casing is taken into account.

However, as the number of battery cells to form the battery are increased, the number of wires are increased in the battery casing and lengths of the respective wires themselves are increased.

Consequently, together with complicated wirings within the battery casing, the signal transmitting wires become susceptible to the high power of the bus bars. In addition, mutually adjacent wires wear out due to the vibrations during the run of the vehicle.

It is, hence, an object of the present invention to provide a multi-cell battery which can prevent a physical interference between the bus bars and the signal transmitting wires and which can have a good wiring operability.

The above-described object of the present invention can be achieved by providing a multi-cell structure battery, comprising: a plurality of cylindrical cells accommodated in a casing; bus bars to connect respective terminals of the cells; signal transmitting wires to connect the respective cells to an external device; a cell holder to hold the cells; and a covering fixed to the cell holder so as to oppose against the terminals of the cells, the bus bars being disposed on an inner surface of the covering opposed to the terminals of the cells and the signal transmitting wires being disposed in an outer surface of the covering.

This summary of the invention does not necessarily describe all necessary features so that the invention may also be a sub-combination of these described features.

BRIEF DESCRIPTION OF THE DRAWINGS:

FIG. 5 is a left side view of the one multi-cell structure battery 1A in the preferred embodiment shown in FIG. 3.

FIG. 6 is a plan view of a battery casing shown in FIG. 5.

FIGS. 8A, 8B, and 8C are detailed profiles of a side cover member of the multi-cell structure battery in the preferred embodiment, FIG. 8A being a top view of the side cover member on which signal transmitting wires 16 are to be extended, FIG. 8B being a view of the side cover member viewed from an arrow-marked directional view of a line A2 in FIG. 8A, and FIG. 8C being a view of the side cover member viewed from an arrow-marked directional view of a line A3 in FIG 8A.

FIG. 9 is an arrow-marked directional view of the side cover member from an arrow mark of A4 in FIG. 8B.

FIG. 12 is a front view of the bus bars 23A and 23B disposed on a side cover 13a.

FIG. 14 is a top view of the side cover 13a on which a low-power system wiring 16 is extended on the side cover 13a.

FIGS. 17A and 17B are explanatory views of cooling wind flow, FIG. 17A being a side view and FIG. 17B being a perspective view representing a flow of the cooling wind along a side of the side cover 13a.

DETAILED DESCRIPTION OF THE PREFERRED EMBODIMENT

Reference will hereinafter be made to the drawings in order to facilitate a better understanding of the present invention.

FIGS. 1 through 17B show a preferred embodiment of a multi-cell battery according to the present invention.

Figure 1:
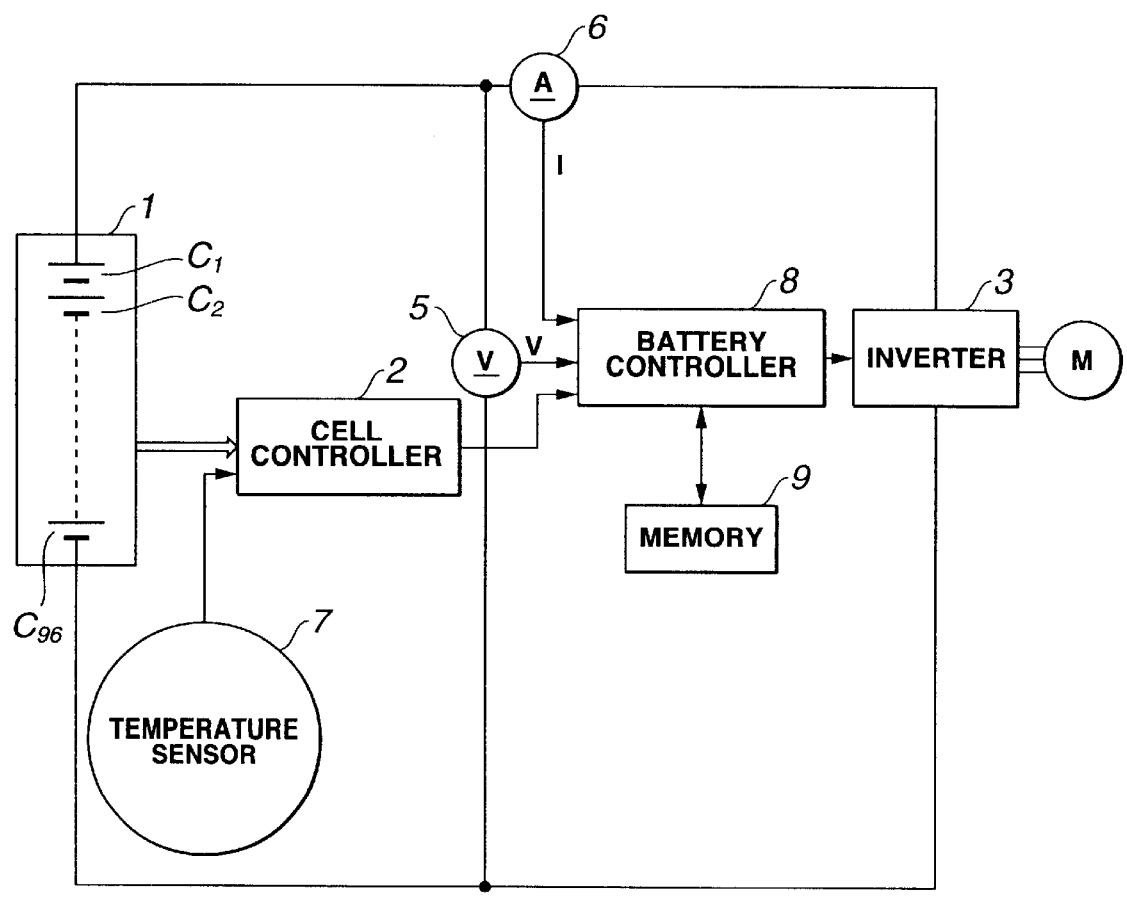
FIG. 1 is a circuit block diagram representing a structure of a running drive mechanism of an electric vehicle to which a multi-cell battery structure in a preferred embodiment according to the present invention is applicable.

FIG. 1 shows a circuit block diagram of a multi-cell battery in a preferred embodiment according to the present invention applicable to a running drive mechanism of an electric vehicle EV.

A battery 1 is constituted by 96 numbers of cells C1 through C96. For example, referring to FIG. 2, two cell groups to form two batteries 1A and 1A, respectively, each battery 1A having 48 cells. Each battery cell C (C1 through C96) is, for example, constituted by Lithium ion battery. A state of each cell C is controlled with a cell controller 2 to perform a deviation correction of each cell terminal voltage Vc from a prescribed voltage.

The cell controller 2 receives the cell terminal voltages Vc and a sensor signals from temperature sensors 7 disposed within each battery cell C and carries out the deviation correction of the cells on the basis of these signal and voltage values.

The battery 1 is supplied with a DC power to an inverter 3 which converts a DC power to an AC power and supplies the AC power to the motor M. In addition, during a power regeneration, a vehicular running energy is inversely converted into an electrical energy via the motor M and the inverter 3. A regenerative brake is supplied to the vehicle together with the charge of the battery 1.

The voltage V and current A of the battery 1 are measured by the voltage sensor 5 and the current sensor 6, respectively. A battery controller 8 carries out output control and regenerative control over the inverter 3 on the basis of control data previously inputted into a cell information (cell voltage).

Figure 2:
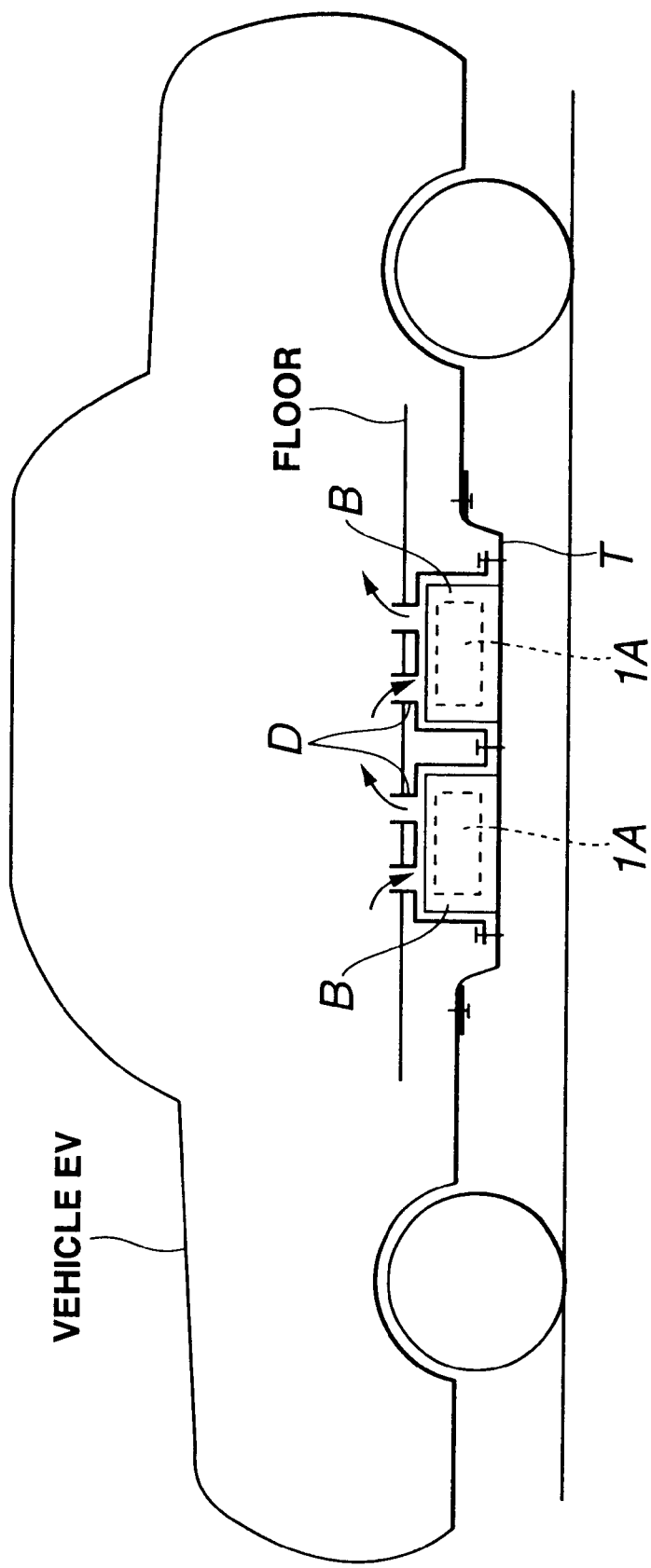
FIG. 2 is a schematic view of the electric vehicle to which the multi-cell structure battery in the preferred embodiment is applicable.

Then, as shown in FIG. 2, the cell 1 is disposed on a tray T installed on an under-floor of the vehicle. The cell 1 is constituted by two multi-cell batteries 1A, each of the two batteries 1A being housed within each water-proof case B. A duct D which communicates between the case B and the vehicular passenger compartment is installed and each battery 1A is cooled with air supplied from the duct D.

Figure 3:
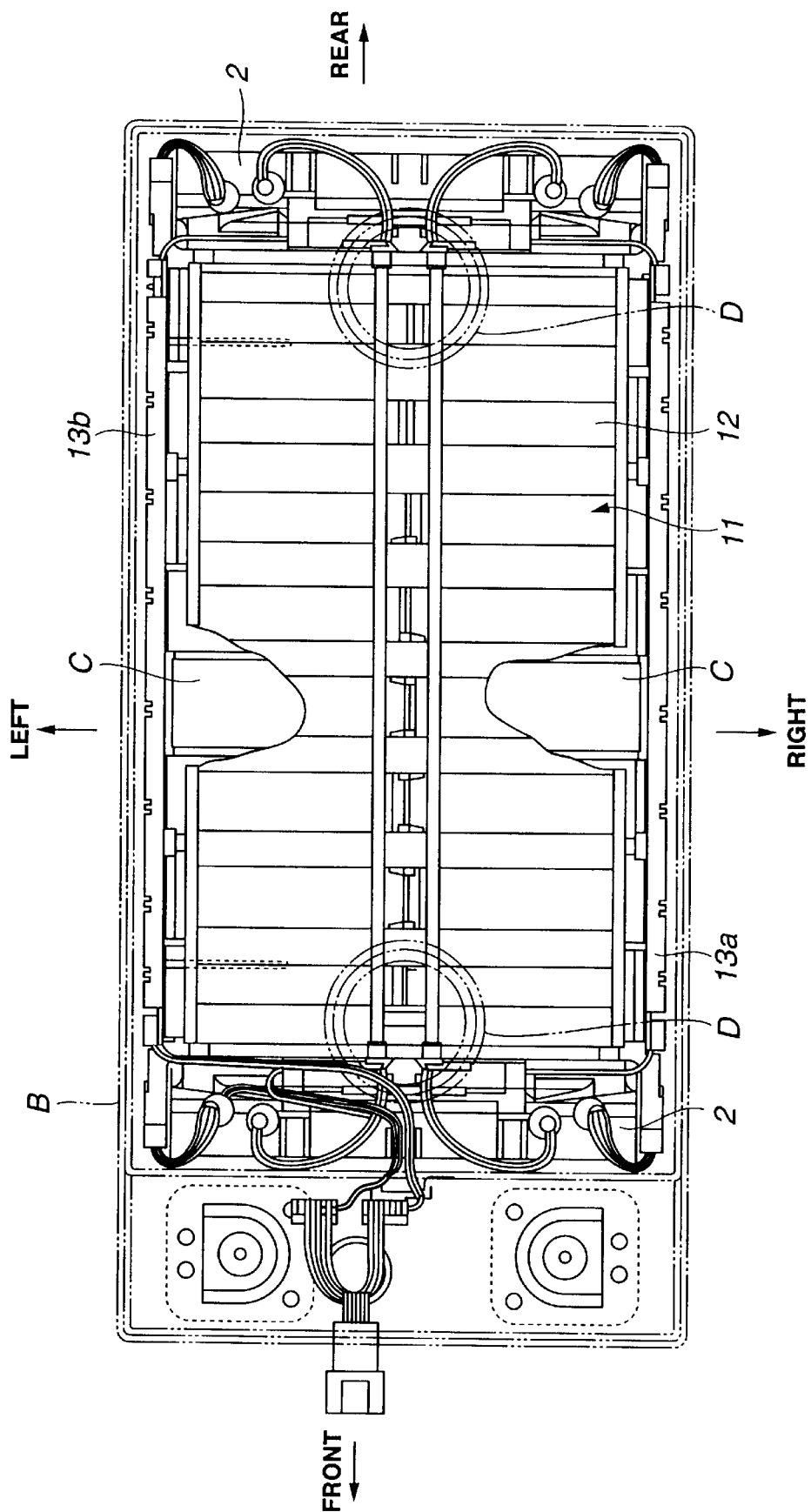
FIG. 3 is a partially cut-out plan view of one of the multi-cell structure batteries 1A in the preferred embodiment shown in FIG. 2.
Figure 4:
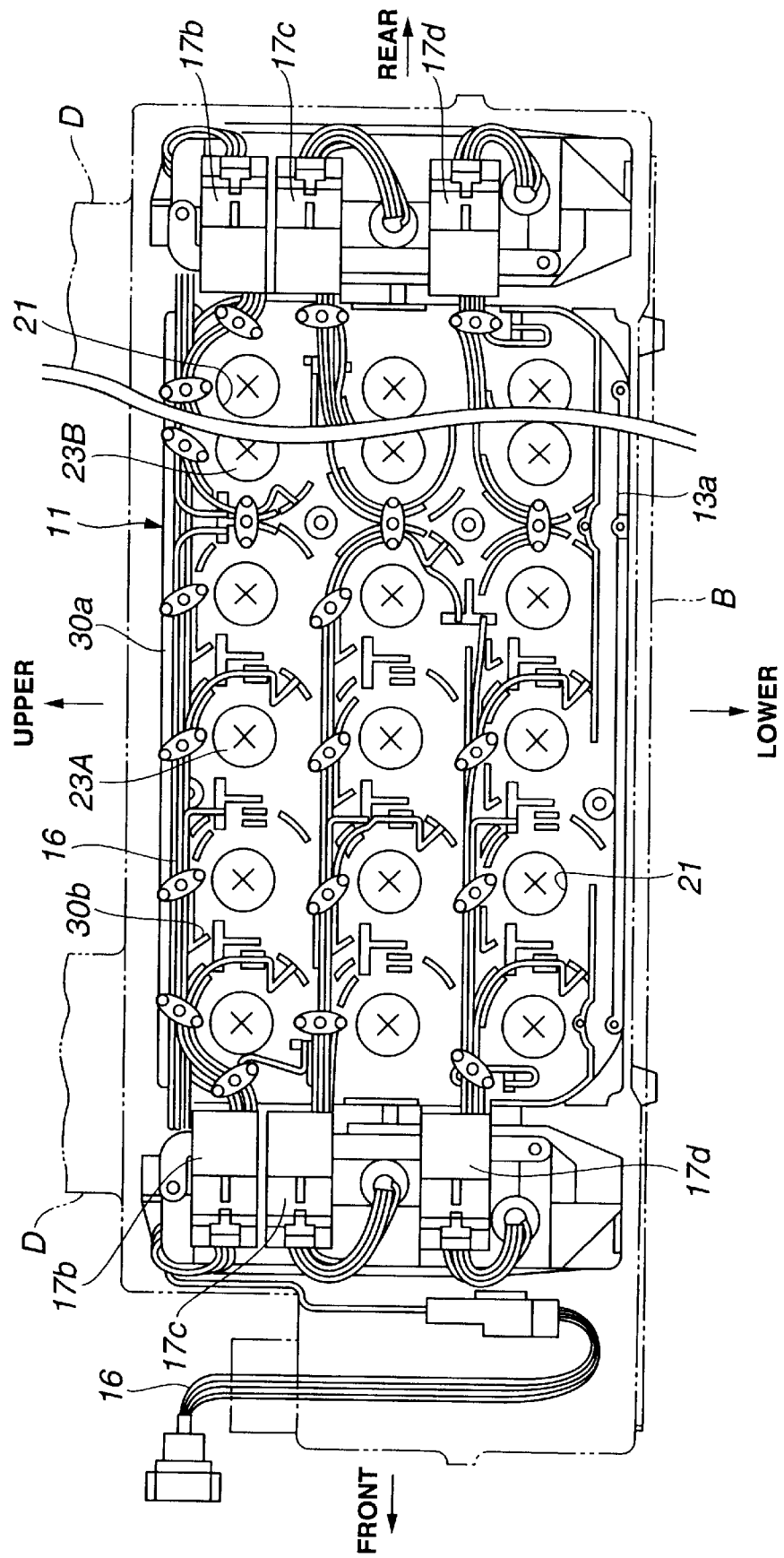
FIG. 4 is a right side view of the one multi-cell structure battery 1A in the preferred embodiment according to the present invention.

FIGS. 3 through 5 are views of an assembly state of the battery 1A.

FIG. 3A is an elevation view, FIG. 4 is a right side view, and FIG. 5 is a left side view of the assembled state of the batteries 1A and 1A. The terms of upper and lower, left and right, and front and rear are defined for explanation conveniences.

Actually, the upper and lower, front and rear portions of the vehicle EV.

Each battery cell 1A includes a battery casing 11 in which the battery cell C is accommodated and a cell controller 2 disposed between the front and rear portions thereof.

The battery casing 11 and cell controller 2 are housed within the water-proof case B denoted by dot-and-dash lines of FIG. 3.

As shown in FIGS. 4 and 5, signal transmitting wires 16 are distributed on a surface outside of the side covers 13a and 13b.

The signal transmitting wires 16 are wires via which the cell controller 2 controls each cell C of the battery and include wires to detect respective cell terminal voltages, to be directed to the temperature sensor or to other electronic devices; and wires to be directed to the cell controller 2 via connectors 17a, 17b, 17c, and 17d.

FIG. 6 shows a plan view of battery casing 11.

Figure 7A:
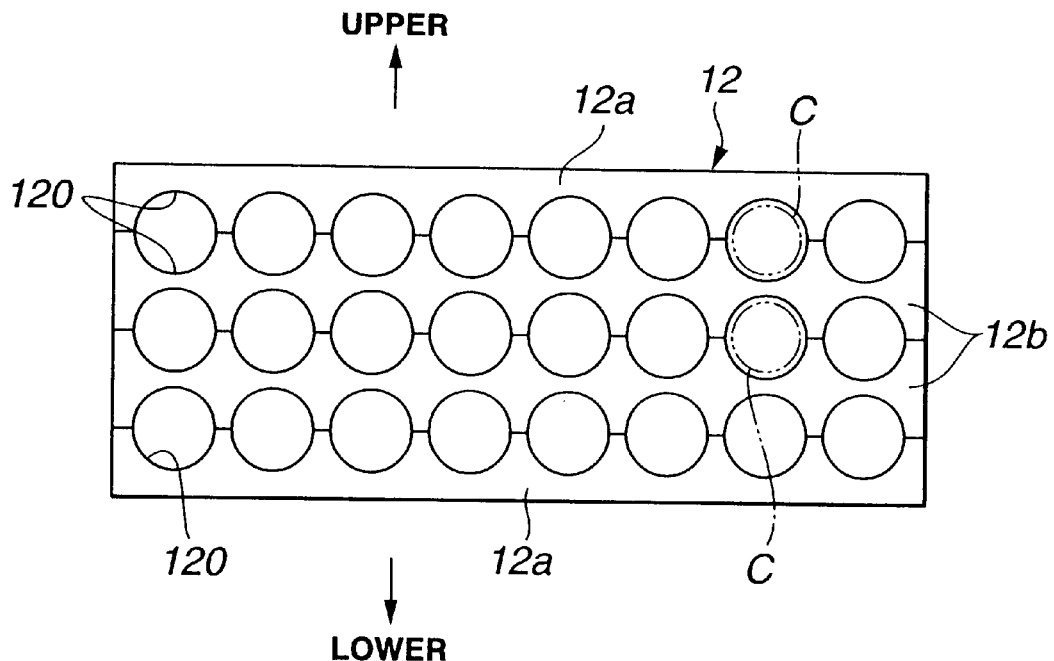
FIGS. 7A and 7B are explanatory views for explaining the battery casing, FIG. 7A being arrow marked directional view from a line A2 in FIG. 6 and FIG. 7B being arrow marked directional view of a line E1 to E1.

FIG. 7A shows a cross sectional view cut away along a line of A1 and A2 of FIG. 5.

Figure 7B:
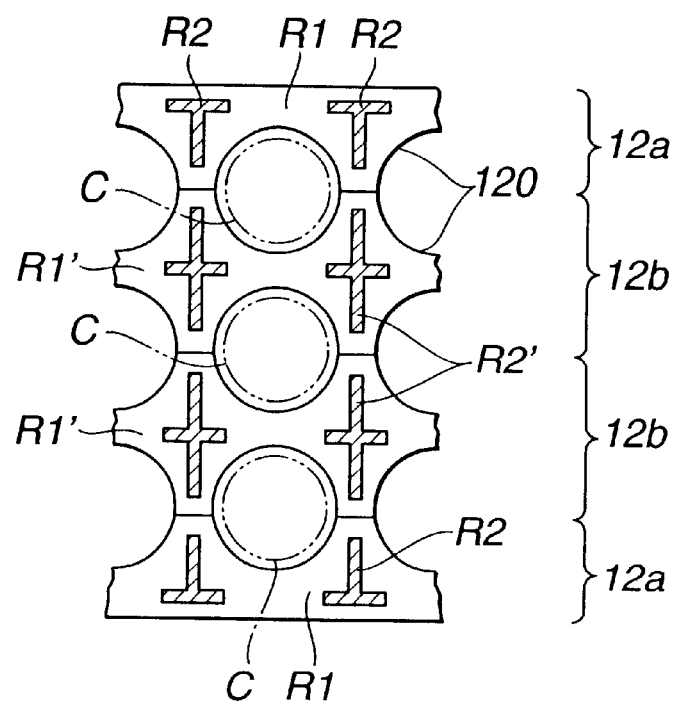

FIG. 7B shows a cross sectional view of E1—E1 shown in FIG. 6.

As shown in FIG. 6, battery casing 11 includes: a cell holder 12 in which battery cell C is retained and housed; and side cover member 13 in which the bus bars and signal transmitting wires are distributed.

It is noted that the side cover member on which the bus bars and signal transmitting wires are distributed are denoted by 13a and 13b and the side covers in which no bus bars are distributed are denoted by 13. 20 denotes a vis (screw) to fix side cover member 13 onto cell holder 12.

As shown in FIG. 7A, cell holder 12 includes four cell holders 12a, 12b, 12b, and 12a laminated in the vertical direction.

A cell holder 12a includes four ribs R1 extended in frontward and rearward directions and reinforcement ribs R2 interposed between each rib R1.

As shown in FIG. 7B, a cross section of each rib R2 is formed of a letter-T shaped cross section. In addition, an intermediate cell holder 12b includes four ribs R1' and reinforcement rib R2' in the same way as cell holder 12a.

The columnar (cylindrically shaped) battery cell C is held by means of arc portions 120 of vertically over lapped rib R1 (or rib R1') and rib R1', as denoted by dot-and-dash lines in FIG. 7B.

As shown in FIG. 3, two battery cells C are serially housed in the rightward and leftward directions in battery casing 11. A total of 48-th numbers of battery cells C are housed at 8 rows×3 columns.

FIGS. 8A and 8B show the detailed shapes of side cover member 13.

FIGS. 8A, 8B, and 8C show detailed profiles of side cover member 13.

FIG. 8A shows a front side of side cover member 13 on which signal transmitting wires 16 are distributed.

FIG. 8B shows an arrow-marked side view of side cover member 13 from an arrow marked direction of A2 in FIG. 8A.

FIG. 8C shows an arrow-marked side view of side cover member 13 from an arrow marked directions of A3 in FIG. 8A.

FIG. 9 shows an arrow-marked rear view of side cover member 13 from an arrow-marked direction of A4 in FIG. 8A.

It is noted that in FIG. 9, the upper-and-lower direction of side cover 13 is reversed to that in FIG. 8A.

FIGS. 10A, 10B, 10C, 11A, and 11B show bus bars 23A and 23B to be disposed on the rear side of side cover member 13.

Figure 10A:
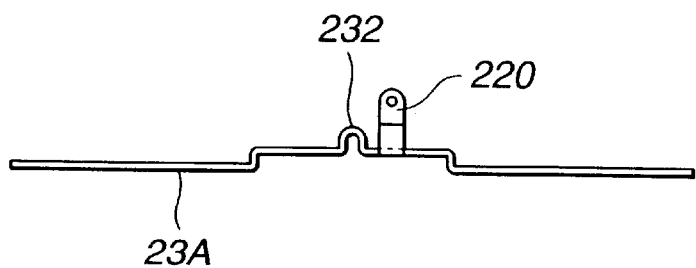
FIGS. 10A, 10B, and 10C are explanatory partial views of bus bar 23A in the side cover member, FIG. 10A being an elevation view of the bus bar 23A, FIG. 10B being a front view thereof, and FIG. 10C being a partial view representing a welding operation of the bus bar 23A and a battery terminal.
Figure 11A:
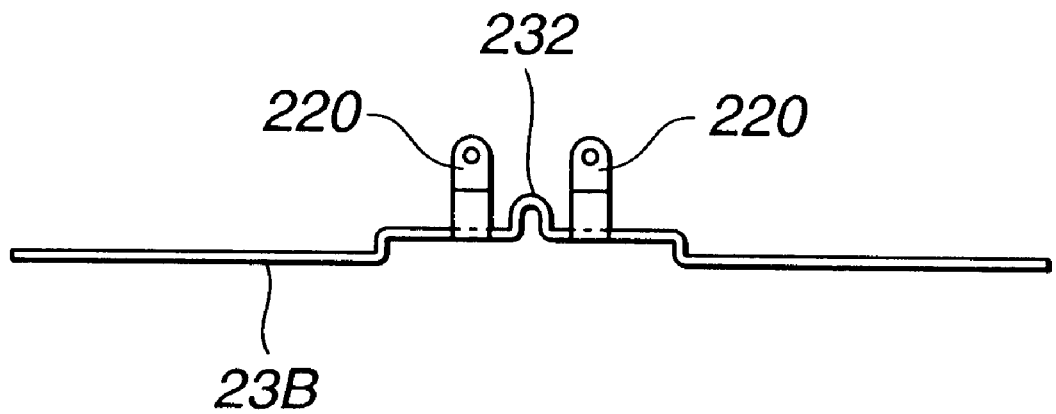
FIGS. 11A and 11B are plan and elevation views of a bus bar 23B.

Specifically, FIGS. 10A and 11A show plan views of respective bus bars 23A and 23B.

Figure 10B:
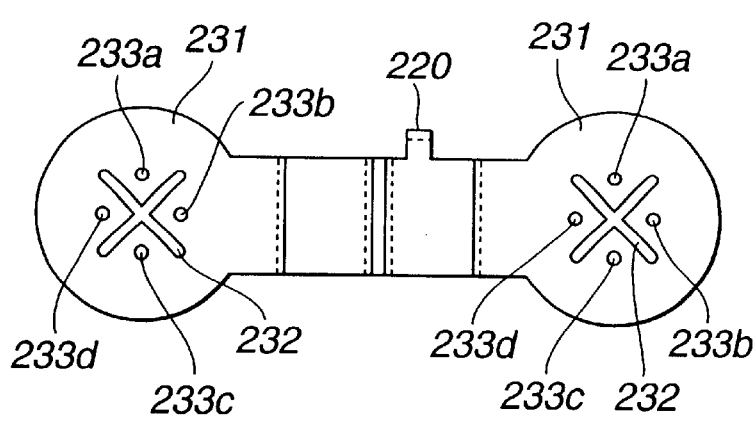
Figure 11B:
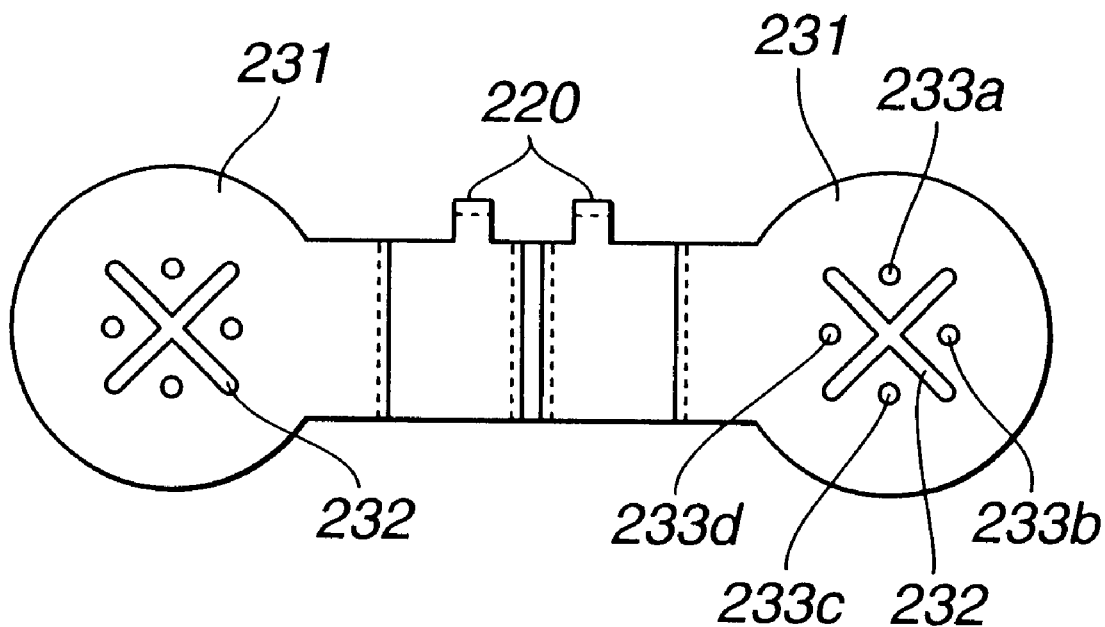

FIGS. 10B and 11B show elevation views of bus bars 23A and 23B viewed from a cell holder 12.

Figure 10C:
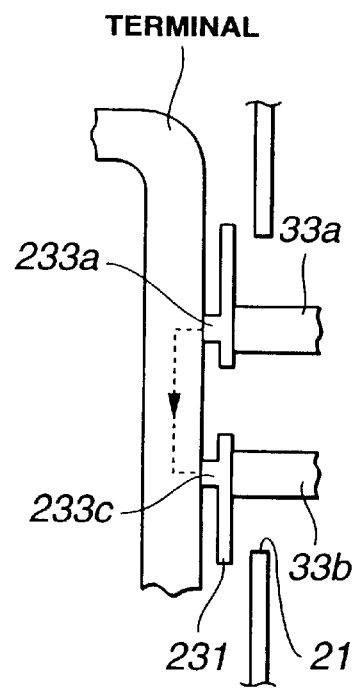

FIG. 10C shows an explanatory view for explaining a welding between bus bar 23A and a cell terminal.

First, side cover member 13 will be explained.

As shown in FIG. 8A, 24 circular holes 21 are formed at equal intervals at column 3 and eight rows on side cover member 13. Ribs 30*a* are projected along an outer peripheral wall of a front side of side cover member 13. A multiple number of Ribs 30*b* are projected along the wall not passing circular holes 21 on a region enclosed with front side ribs 30*a*. Consequently, the front surface of side cover member 13 is formed with a groove 31 including by means of ribs 30*a* and 30*b*.

A letter-T shaped slit 22 and an arc-shaped slit 24 are formed on side cover member 23.

Bus bars 23A and 23B are disposed on the letter-T shaped slit 22. Slit 24 is used to draw out the wiring of the temperature sensor disposed within battery casing 11 externally. The above-described groove 31 is formed so as to avoid a passage of circular holes 21 in a direction of the slits 22 and 23. In FIG. 8B, numeral 131 denotes a boss on which a through hole for vis (screws) 20 (refer to FIG. 6).

Figure 13:
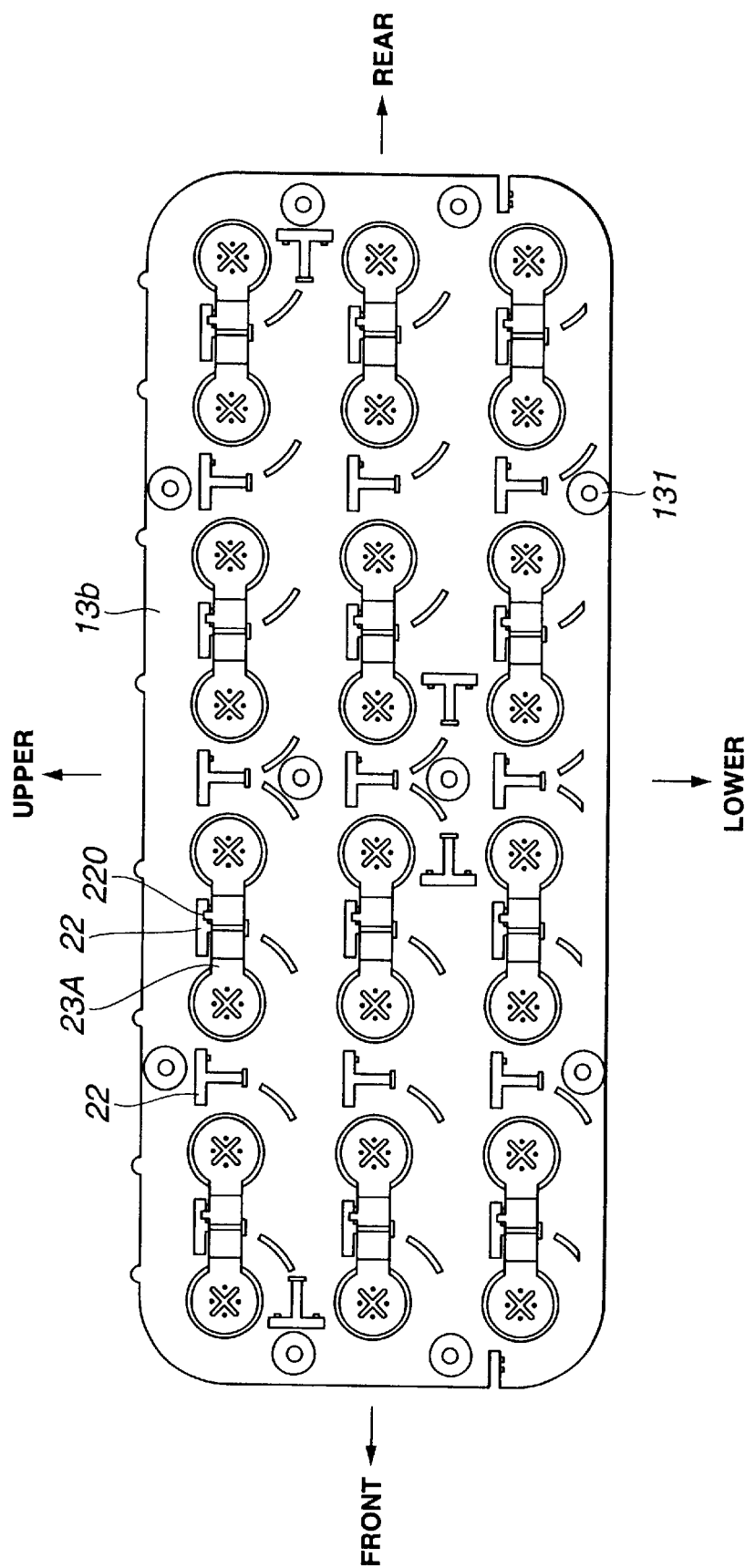
FIG. 13 is a front view of the bus bars 23A and 23B disposed on a side cover 13b.

As shown in FIGS. 12 and 13, bus bars 23A and 23B are disposed in plural on the rear side of side cover member 13. Alignments of bus bars 23A and 23B are different from each other in side covers 13*a* and 13*b*. That is to say, FIG. 12 shows a rear surface of side cover 13*a* shown in FIG. 4 and FIG. 13 shows a rear surface of side cover 13*b*, respectively. Bus bars 23A and 23B are high power system wires to connect terminals of the battery cell group C housed in cell holder 12, each battery cell adjoined in parallel to each other.

The reason that each bus bar 23A and 23B is arranged in a different manner between side cover 13*a* shown in FIG. 12 and that 13*b* shown in FIG. 13 is that each bus bar 23A and 23B is arranged so that 48 number of battery cells C housed in battery casing 11 are connected in series with each other.

It is noted that although an upper direction in FIG. 9 corresponds to a lower side of vehicle EV and side cover member 13 in FIG. 9 is shown up-side down in the case of FIGS. 12 and 13 so that the upper and lower directions of the related drawings correspond to the upper and lower sides of the vehicle.

As shown in FIGS. 10A through 11B, circular cell connectors 231 are formed to be welded on terminal portions of battery cell group C. A convex portion 232 is formed on an intermediate position between cell connectors 231. Numeral 220 is a tag terminal extended in a projection direction of recess 232 for bus bar 23A. Tag terminals 220 are two in the case of bus bar 23B. Signal transmitting wires 16 are connected to these terminals 220.

When bus bars 23A and 23B are disposed in the wiring pattern of FIGS. 12 and 13. Convex portion 232 is fitted into portions denoted by symbols S (refer to FIG. 9) of slits 22 of side cover member 13. In this way, when bus bars 23A and 23B are fixed onto side cover member 13, cell connectors 231 of bus bars 23A and 23B are opposed against circular holes 21 as shown in FIGS. 4 and 5 so that tag terminals 220 are projected on the front side of side cover member 13 via slits 22.

Four welding projections 233*a*, 233*b*, 233*c*, and 233*d* are formed so as to cross over a Greek cross shaped slit 230, slit 230 being formed on a center portion of each cell connector 231 of bus bars 23A and 23B.

When cell connectors 231 are welded on terminals of battery cell group C, welding electrodes 33*a* and 33*b* are brought in contact with projections 233*a* and 233*c* through the corresponding circular hole 21 at side cover member 13 and, thereafter, these portions are welded therewith.

Since slit 232 is formed between projections 233*a* and 233*c*, a current flows through a path such as denoted by a broken line of FIG. 10C, viz., projections 233*a*→battery cell C terminal→projection 233*a* and the welding is carried out at projection portions 233*a* and 233*c*.

Figure 14:
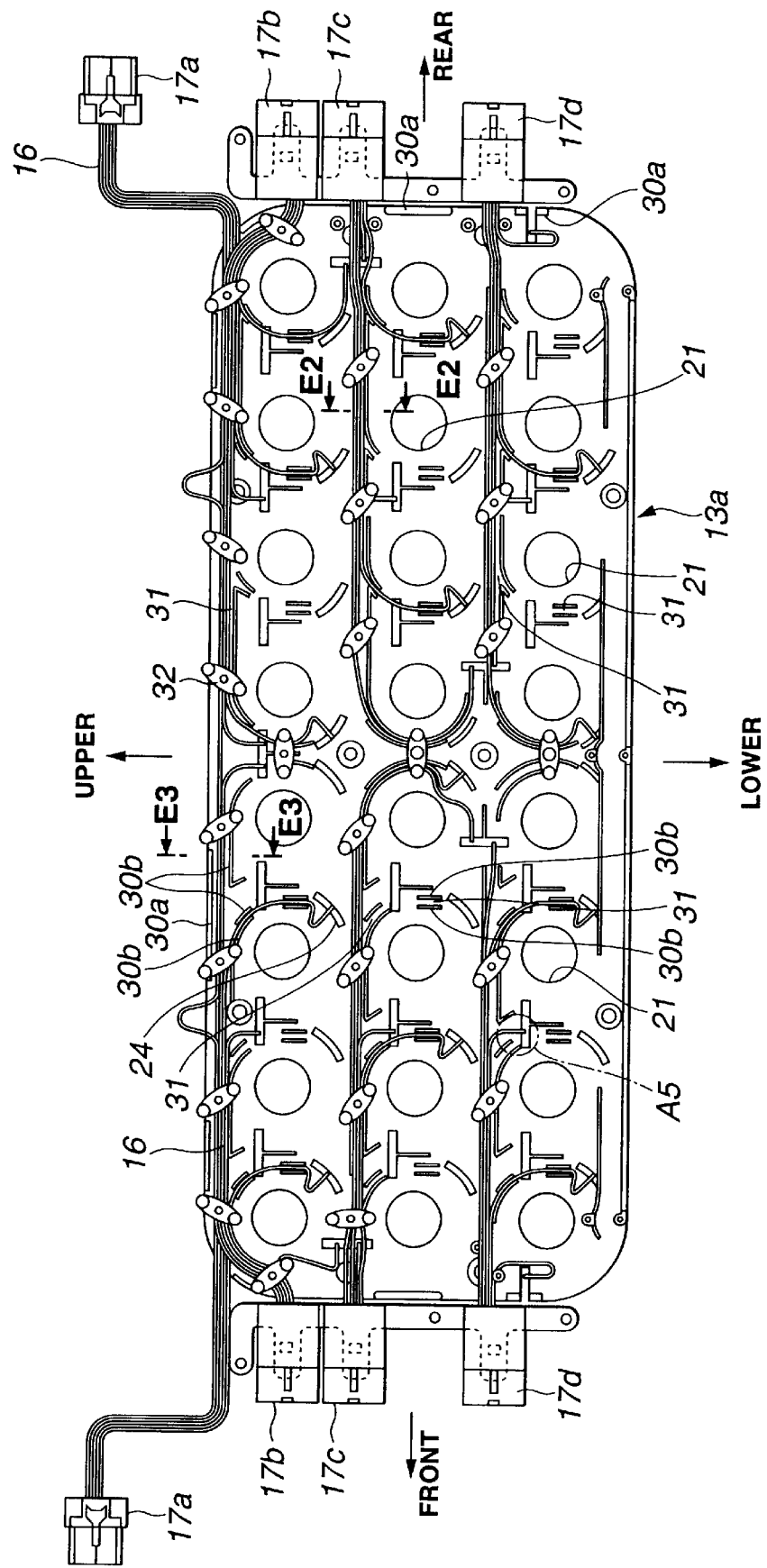
Figure 15:
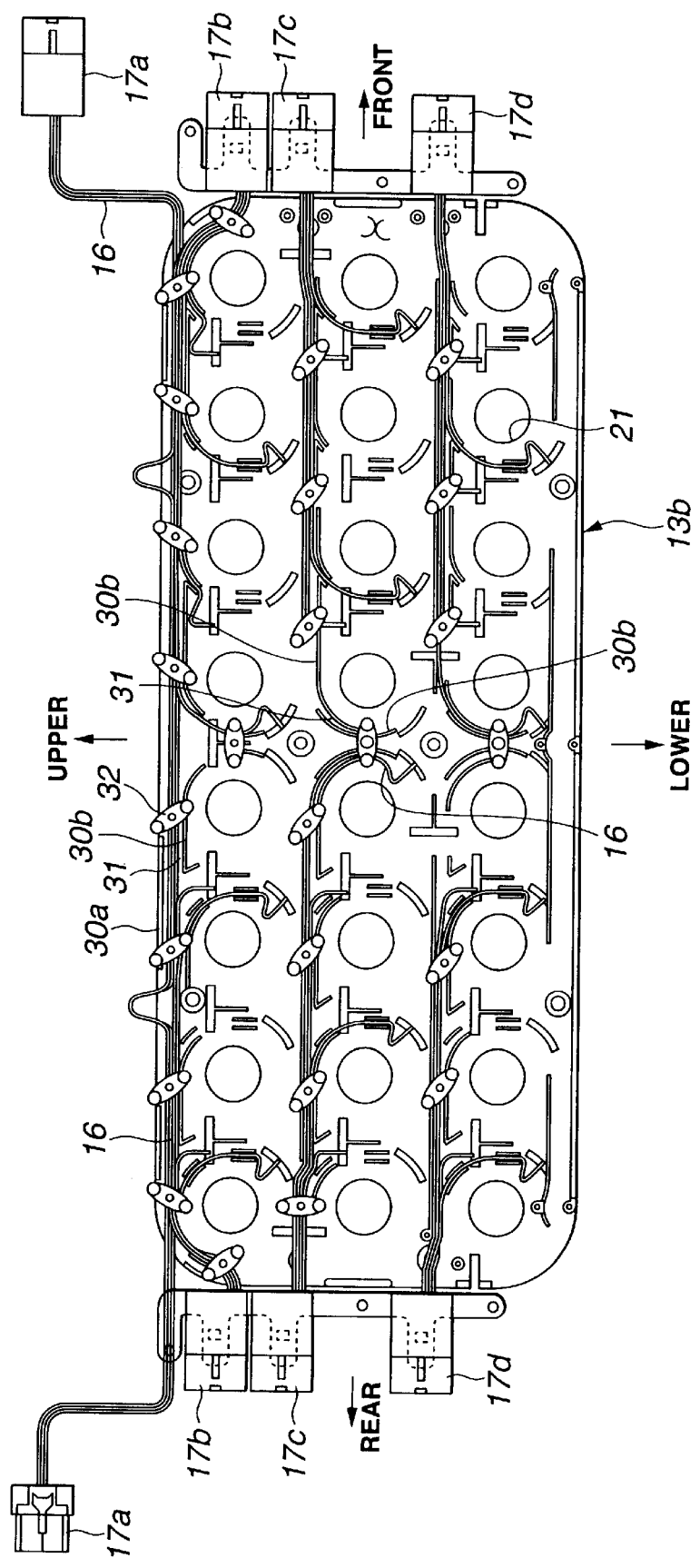
FIG. 15 is a top view of the side cover 13b on which a low-power system wiring 16 is extended on the side cover 13b.

FIGS. 14 and 15 show low power system signal transmitting wires 16 to be disposed on the front surface of side cover member 13.

FIG. 14 shows the front surface of side cover 13*a* shown in FIG. 4 and FIG. 15 shows the front surface of side cover 13*b* shown in FIG. 5.

Figure 16A:
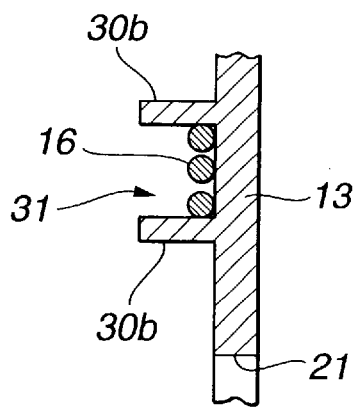
FIGS. 16A, 16B, and 16C are explanatory views of the low-power system wiring 16, FIG. 16A being a cross sectional view thereof cut away along a line E2 to E2 in FIG. 14, FIG. 16B being a cross sectional view thereof cut away along a line E3 to E3 in FIG. 14, and FIG. 16C being an expanded view of a connection portion between a connection terminal 220 and a low-power system wiring 16.
Figure 16B:
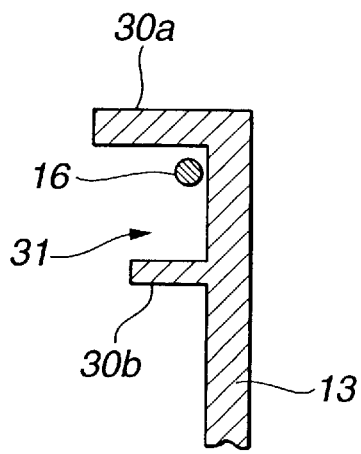

FIGS. 16A and 16B show cross sectional views cut away along a line E2—E2 and a line E3—E3 shown in FIG. 14. As appreciated from FIGS. 16A and 16B, signal transmitting wires 16 are distributed with grooves 31 formed with ribs 30*a* and 30*b*. As shown in FIGS. 14 and 15, signal transmitting wires 16 wired in grooves 31 are bundled and drawn out from portions at which ribs 30*a* are interrupted into the forward-and-rearward directions of side covers 13*a* and 13*b*.

Then, via connectors 17*a* through 17*d*, signal transmitting wires 16 are connected to cell controller 2 (refer to FIGS. 3 and 4). Grooves 31 are formed so as to avoid circular holes 21 to which cell connectors 231 of bus bars 23A and 23B are opposed so that signal transmitting wires 16 are not brought in contact with cell connectors 231.

Figure 16C:
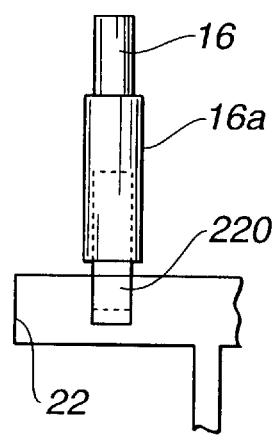

FIG. 16C is an expanded view of a portion denoted by a symbol A5 in FIG. 14. That is to say, FIG. 16C shows the expanded view of a connection portion between connection terminal 220 and signal transmitting wires 16 of bus bars 23A and 23B.

As shown in FIG. 16C, with connection (tag) terminal 220 projected on the front side of side covers 13*a* and 13*b* via slit 22 inserted into a sheath-like connection terminal 16*a* attached on signal transmitting wires 16, a soldering is carried out for terminals 220 and 16*a*.

A press 32 is disposed on an upper end of groove 31, as shown in FIGS. 14 and 15, to prevent signal transmitting wires 16 disposed in groove 31 from moving out toward the side end of the corresponding side cover 13*a* (or 13*b*).

Next, an assembly procedure of battery casing 11 will be described below.

That is to say, bus bars 23A and 23B and signal transmitting wires 16 are extended on the front and rear sides of side covers 13*a* and 13*b*, as shown in FIGS. 12 through 15.

As shown in FIG. 16C, connection terminals 220 and signal transmitting wires 16 are connected.

Next, with eight group of two serially connected battery cells C (not shown) mounted on respective arc portions 120 of lower side cell holder 12a shown in FIG. 7A, cell holder 12*b* is overlapped on cell holder 12*a* and adhered thereon with an adhesive.

Consequently, each battery cell is held by means of upper and lower arc portions 120. Battery cell group C at a second step is mounted on each arc portion 120 of cell holder 12*b* with cell holder 12*b* overlapped to be joined to lower cell holder 12*b*. The cell holder 12*b* is overlapped on second step battery cell group C to be joined to lower cell holder 12*b*. Finally, a three-step battery cell C (not shown) is mounted on upper cell holder 12*b*. The upper cell holder 12*b* is overlapped on upper cell holder 12*b* to be joined to cell holder 12*a*.

Next, as shown in FIG. 6, side covers 13*a* and 13*b* are attached on both side surfaces of cell holder 12 with screws.

As described above, as shown in FIGS. 3 through 5, battery casing 11 is assembled in which battery cells C are housed. Since, under the above-described condition, the connection between bus bars 23A, 23B and terminal of battery cell group C is not made, through circular holes 21 of side covers 13a and 13b, the terminal of battery cell group C is spot welded to cell connector 231 of battery cell's connecting portion 23' via circular hold C.

Upon a completion of the welding on projections 233a and 233c as shown in FIG. 10C, electrodes 33a and 33b are rotated through 90 degrees to weld projections 233b and 233d.

Thereafter, cell controller 2 and signal transmitting wires 16 are connected via connectors 17a through 17d. As shown in FIG. 3, both of battery casing 11 and cell controller 2 are integrally housed in water-proof case B.

Advantages of the multi-cell battery structure in the preferred embodiment according to the present invention will be described below as compared with the previously proposed cell structured battery.

(1)Since bus bars 23A and 23B (high-power system wires) and the low-power system signal transmitting wires 16 are distributed on the front and rear sides of side cover member 13 separately, no mixed distribution of the high and low power system wires occurs. Consequently, the electrical and magnetic influences from the high power system wires to the low power system wires can be reduced. Especially, ribs 30a and 30b cause low-power system signal transmitting wires 16 to be drawn out to avoid circular holes 21 to which bus bars 23A and 23B are exposed, both of low-power system signal transmitting wires 16 and bus bars 23A and 23B are not brought in contact with each other even if a vibration is applied to the battery. Consequently, there is less possibility that both wires rub together.

(2)Since grooves 31 formed by means of ribs 30a And 30b are formed on the front side of side cover member 13, low-power system wires 16 are distributed along groove 31 so that appropriate wiring can automatically be carried out. Therefore, a wiring operation on low-power system transmitting wires 16 can be simplified, the wiring operation can be secured, and the wiring operability can be improved.

Since low-power system signal transmitting wire 16 and bus bars 23A and 23B are previously sub-assembled in side covers 13a and 13b, almost no assembly difficulty in the wiring occurs.

Consequently, the battery assembly operation can be simplified and an assembly operation efficiency can be improved.

(3) When the battery replacement operation is carried out and the side cover of the battery collides with an obstacle, ribs 30a and 30b can protect low-power system signal transmitting wires 16 and can prevent a breakage in a coating of signal transmitting wires 16.

Figure 17A:
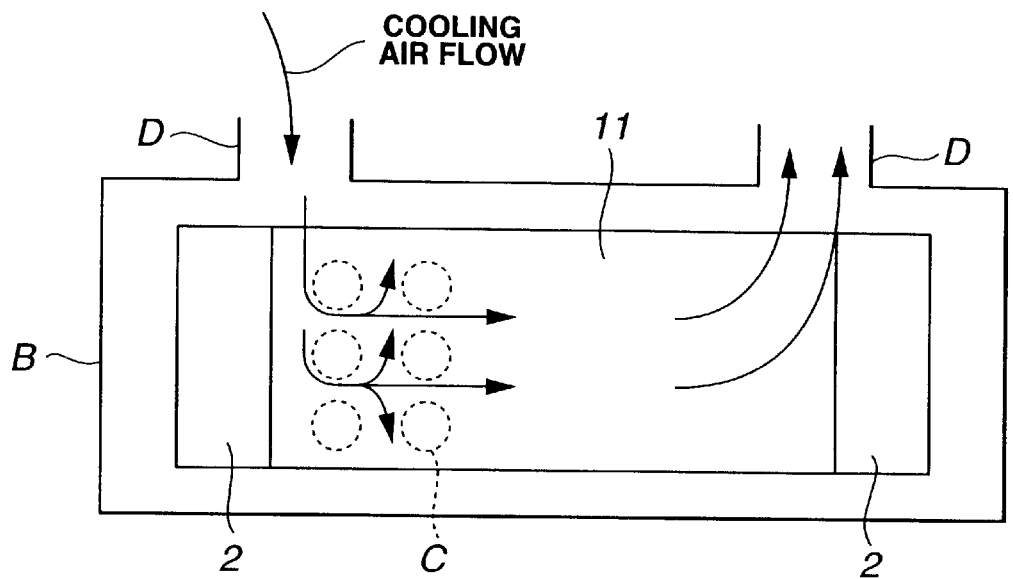
Figure 17B:
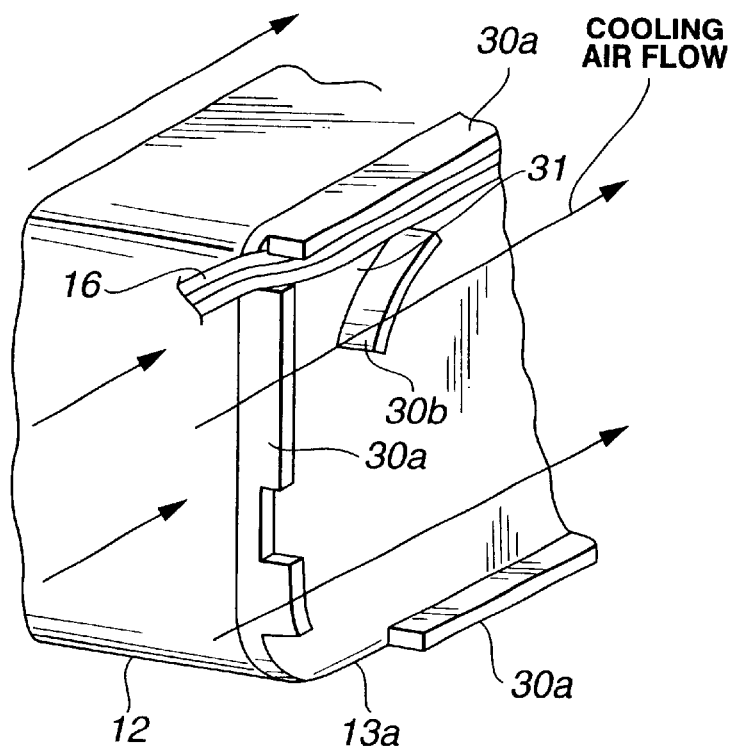

(3)As shown in FIG. 17A, battery casing 11 in which battery cell group C are accommodated is housed in water-proof case B. Each battery cell C is cooled with a cooling air flow from a duct D. The cooling air flow from duct D flows backward from the forward direction of battery casing 11. However, part of the cooling air flows in the rearward direction along side covers 13a and 13b as shown in FIG. 17B. Since signal transmitting wires 16 are disposed within groove 31 formed by means of ribs 30a and 30b which serves to provide a shield plate so as to prevent adhesion of dust onto signal transmitting wires 16.

(4)The ribs 30a and 30b are provided on side cover member 13 to form grooves 31 between these ribs. However, the groove may be formed on continuous recess portions formed on side cover member 13.

It is noted that battery casing 11 corresponds to a casing, side cover member 13 corresponds to a covering, low-power system signal transmitting wires 16 corresponds to signal transmitting wires, and grooves 31 correspond to a guide.

It is also noted that the connector includes connector boxes 17b, 17c, 17d as shown in FIG. 4 and collecting connector 17a to connect an external device such as cell controller 2 as shown in FIGS. 14 and 15.

The entire contents of a Japanese Patent Application No. Heisei 11-168266 (filed in Japan on Jun. 15, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A multi-cell structure battery, comprising:
a plurality of cylindrical cells accommodated in a casing;
bus bars to connect respective terminals of the cells;
signal transmitting wires to connect the respective cells to an external device;
a cell holder to hold the cells; and
a covering fixed to the cell holder so as to oppose against the terminals of the cells, the bus bars being disposed on an inner surface of the covering opposed to the terminals of the cells and the signal transmitting wires being disposed in an outer surface of the covering.

2. A multi-cell structure battery as claimed in claim 1, wherein a guide to guide the signal transmitting wires along a predetermined route is provided on the outer surface of the covering.

3. A multi-cell structure battery as claimed in claim 2, wherein the guide is formed on a groove between pairs of ribs formed on the outer surface of the covering.

4. A multi-cell structure battery as claimed in claim 3, wherein the outer surface of the covering is a front surface of a side cover member fixed onto either side of the cell holder.

5. A multi-cell structure battery as claimed in claim 1, wherein the pairs of the ribs are extended for the signal transmitting wires to avoid passages over circular holes formed on either of the side cover members.

6. A multi-cell structure battery as claimed in claim 5, wherein the bus bars and signal transmitting wires are sub-assembled on each of the side cover members.

7. A multi-cell structure battery as claimed in claim 6, wherein each of the bus bars comprises: a pair of circular cell connecting portions welded to the corresponding terminals of the cells; a convex portion interposed between the pair of circular cell connecting portions; and at least one connection terminal extended along the convex portion and connected to one of the signal transmitting wires, each cell connecting portion having projections welded to the corresponding one of the terminals of the cells via one of the circular holes and a Greek cross-shaped slit formed between the projections.

8. A multi-cell structure battery as claimed in claim 1, wherein the casing is housed in a water-proof case.

9. A multi-cell structure battery as claimed in claim 8, wherein the water-proof case is cooled with a cooling air supplied from a duct.

10. A multi-cell structure battery as claimed in claim 1, wherein the water-proof case is installed in a lower space of a floor of a vehicular body.

11. A multi-cell structure battery as claimed in claim 1, wherein the vehicular body is a vehicular body of an electric vehicle.

12. A multi-cell structure battery as claimed in claim 1, wherein the casing accommodates totally 48 cells, a pair of cells thereof being connected in series with each other and 24 pairs of the cells being arranged in parallel to each other and connected in series via the bus bars at three rows and eight columns.

13. A multi-cell structure battery as claimed in claim 1, wherein the external device is a cell controller.

14. A multi-cell structure battery, comprising:
a plurality of cell means accommodated in casing means;
metallic connecting means for connecting respective terminals of the cell means;
signal transmitting wire means to connect the respective cells to an external control means to control the cell means;
cell holding means for holding the cells; and
covering means fixed to the cell holder so as to oppose against the terminals of the cell means, the metallic connecting means being disposed on an inner surface of the covering means opposed to the terminals of the cell means and the signal transmitting wire means being disposed in an outer surface of the covering means.

* * * * *